United States Patent
Tracy et al.

(10) Patent No.: US 8,704,487 B2
(45) Date of Patent: Apr. 22, 2014

(54) ELECTRONIC DEVICE HAVING A BATTERY PACK TO SUPPORT A DISPLAY

(75) Inventors: Mark S. Tracy, Tomball, TX (US);
Jonathan R. Harris, Cypress, TX (US);
Paul J. Doczy, Cypress, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1523 days.

(21) Appl. No.: 11/786,405

(22) Filed: Apr. 11, 2007

(65) Prior Publication Data
US 2008/0253066 A1    Oct. 16, 2008

(51) Int. Cl.
*H02J 7/00*    (2006.01)

(52) U.S. Cl.
USPC ......................................................... 320/114

(58) Field of Classification Search
USPC ................. 320/103, 106, 107, 111, 112, 114;
429/96, 98, 99, 100
See application file for complete search history.

(56) References Cited

U.S. PATENT DOCUMENTS

| | | | |
|---|---|---|---|
| 5,133,076 A | 7/1992 | Hawkins et al. | |
| 5,293,300 A * | 3/1994 | Leung | 361/679.59 |
| 5,583,744 A * | 12/1996 | Oguchi et al. | 361/679.58 |
| 5,899,421 A | 5/1999 | Silverman | |
| 5,901,035 A * | 5/1999 | Foster et al. | 361/679.55 |
| 6,016,248 A | 1/2000 | Anzai et al. | |
| 6,191,941 B1 * | 2/2001 | Ito et al. | 361/679.27 |
| 6,284,407 B1 * | 9/2001 | Murray et al. | 429/186 |
| 6,535,378 B1 * | 3/2003 | Oguchi et al. | 361/679.55 |
| 6,825,415 B1 | 11/2004 | Chen et al. | |
| 7,025,274 B2 | 4/2006 | Solomon et al. | |
| 7,055,215 B1 * | 6/2006 | Ligtenberg et al. | 16/307 |
| 7,167,358 B2 | 1/2007 | Iwasaki | |
| 2003/0004690 A1 * | 1/2003 | Maeda et al. | 702/188 |
| 2003/0034952 A1 * | 2/2003 | Wang et al. | 345/156 |
| 2004/0191614 A1 | 9/2004 | Iwasaki | |
| 2005/0200608 A1 * | 9/2005 | Ulla et al. | 345/168 |

FOREIGN PATENT DOCUMENTS

| | | |
|---|---|---|
| JP | 2004-220440 | 5/2002 |
| KR | 10-2005-0028943 | 4/2005 |
| KR | 10-2005-000056717 | 6/2005 |
| KR | 10-2005-0104784 | 11/2005 |

\* cited by examiner

*Primary Examiner* — Arun Williams

(57) ABSTRACT

A power supply support system comprises a battery pack comprising a variably positionable support arm configured to support an electronic device in a plurality of different viewing orientations.

20 Claims, 2 Drawing Sheets

ELECTRONIC DEVICE HAVING A BATTERY PACK TO SUPPORT A DISPLAY

BACKGROUND

Tablet computers are configured for on-screen input via an electronic pen. The tablet computer may be held by a user or, if a user desires to use the tablet computer without holding it (e.g., to enable multi-tasking or due to fatigue from supporting the tablet for extended periods of time), the user may rest the tablet computer on a support surface, such as a desk or tabletop. However, once laid down, the tablet computer is not necessarily in the best position to facilitate use and/or viewing thereof.

DETAILED DESCRIPTION OF THE DRAWINGS

Figure 2:
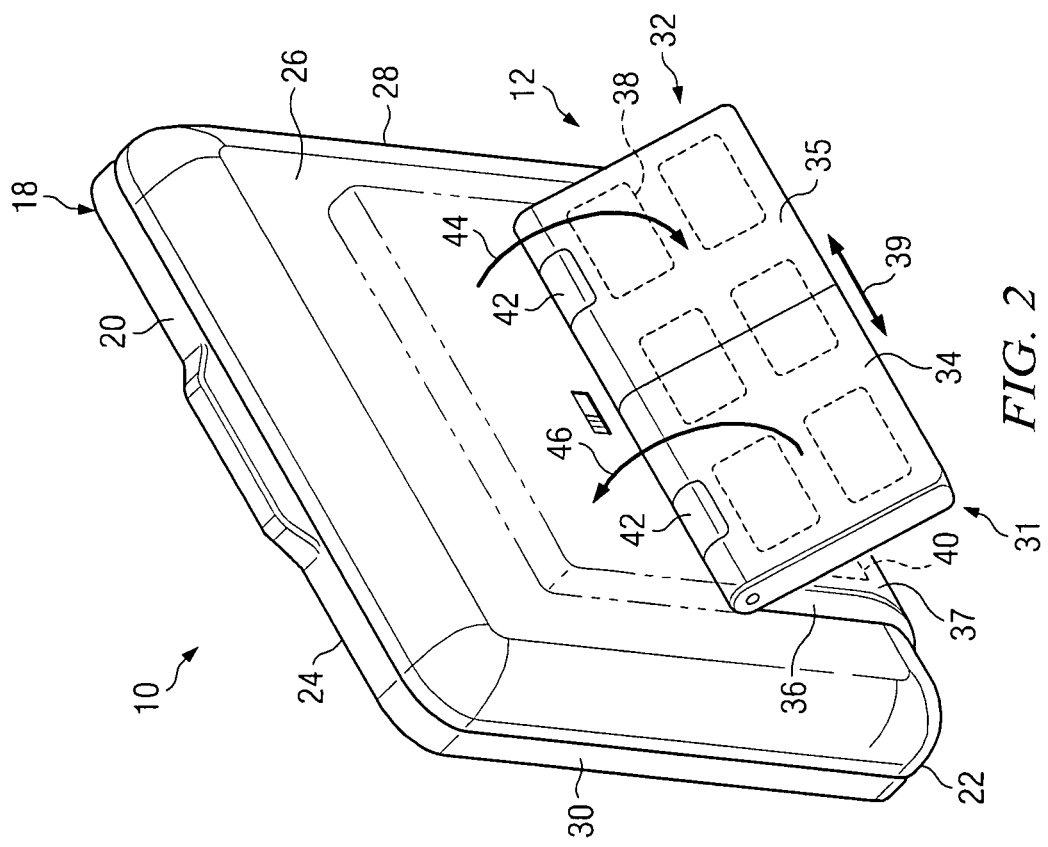
FIG. 2 is diagram of a rear view of the electronic device and power supply support system of FIG. 1.
Figure 1:
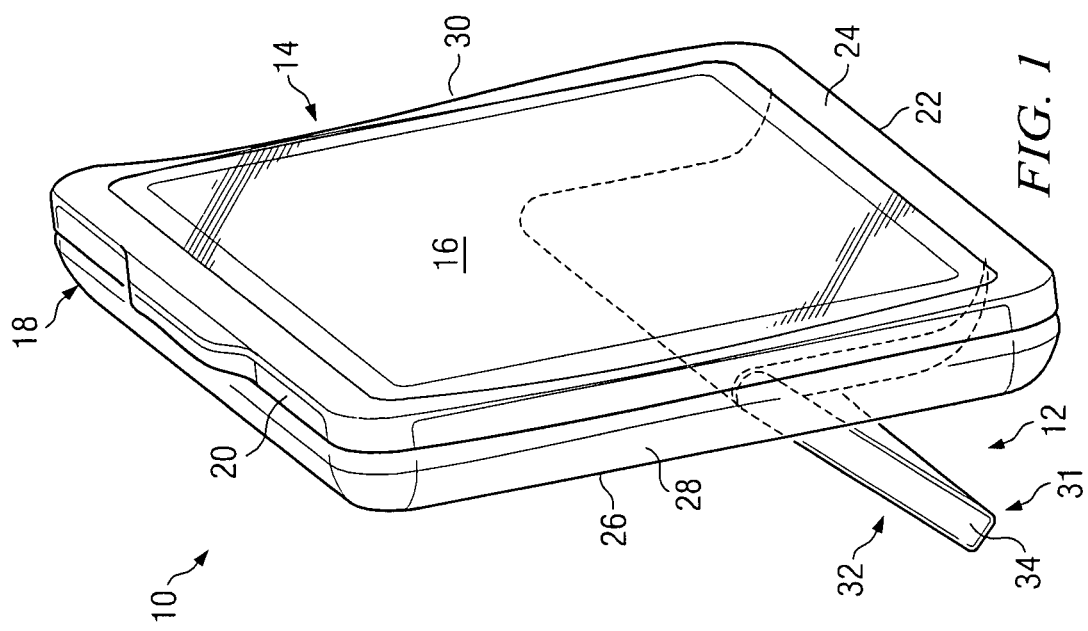
FIG. 1 is a diagram illustrating an electronic device in which a power supply support system is employed to advantage.
Figure 3:
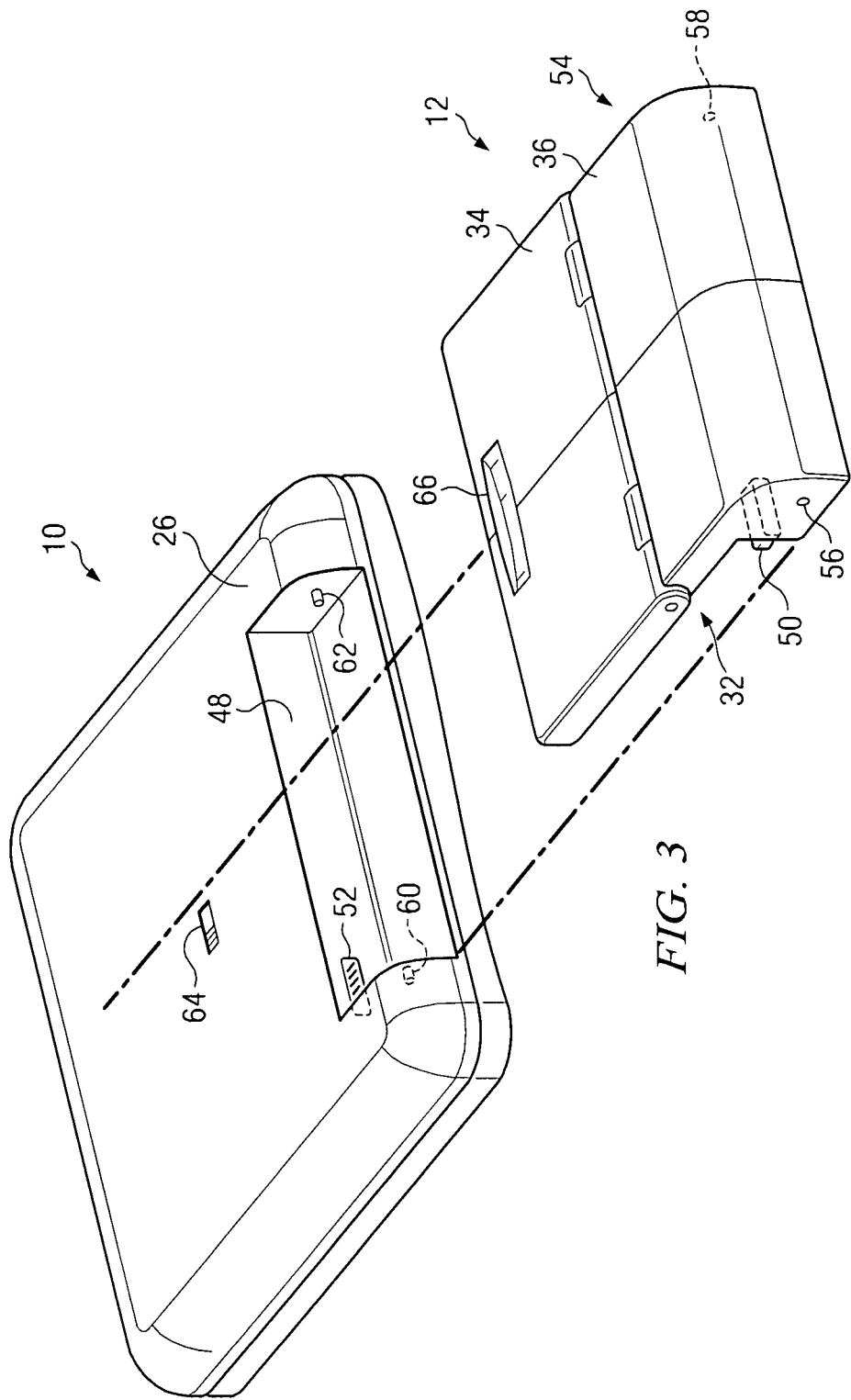
FIG. 3 is a diagram of the power supply support system of FIG. 1 detached from the electronic device.

Various embodiments and the advantages thereof are best understood by referring to FIGS. 1-3, like numerals being used for like and corresponding parts of the various drawings.

FIG. 1 is a diagram illustrating an electronic device 10 in which an embodiment of a power supply support system 12 is employed to advantage. In the embodiment illustrated in FIG. 1, electronic device 10 comprises a tablet computer 14 having a display screen 16 configured to receive input via a stylus or computer pen; however, it should be understood that electronic device 10 may comprise any type of electronic device such as, but not limited to, a convertible notebook or laptop computer, a personal digital assistant (PDA), a monitor, a gaming device or any other type of portable or non-portable electronic device. In the embodiment illustrated in FIG. 1, electronic device 10 comprises a housing 18 comprising a top wall 20, a bottom wall 22, a front wall 24, a rear wall 26 and a pair of sidewalls 28 and 30.

In the embodiment illustrated in FIG. 1, power supply support system 12 comprises a support assembly 31 for supporting electronic device 10 in a plurality of different viewing orientations. In some embodiments, support assembly 31 is configured as a battery pack 32 configured to supply power to electronic device 10; however, it should be understood that support assembly 31 may be configured to support electronic device 10 at one of a plurality of desired orientations without power supply capabilities. In the embodiment illustrated in FIG. 1, support assembly 31 comprises a variably positionable support arm 34 configured to support electronic device 10 in a plurality of different viewing orientations. In the embodiment illustrated in FIG. 1, system 12 is coupled to rear wall 26 and is configured to support electronic device 10 in a generally upright position when disposed on a support surface.

FIG. 2 is diagram of a rear view of electronic device 10 and power supply support system 12 of FIG. 1. In the embodiment illustrated in FIG. 2, support arm 34 is rotatably coupled to a base member 36 of battery pack 32 via a plurality of hinges 42 to enable variable positioning of support arm 34 relative to base member 36. According to some embodiments, support arm 34 and base member 36 each comprise internal cavities 35 and 37 for housing and/or otherwise receiving battery cells 38 and 40, respectively, for supplying power to electronic device 10; however, it should be understood that arm 34 and/or base 36 may be configured without battery cells 38 and/or 40, respectively. In some embodiments, battery cells 38 and 40 comprise rechargeable battery cells 38 and 40 configured to be recharged by an external power supply coupleable to electronic device 10 (e.g., recharged by power received through electronic device 10) and/or coupleable directly to battery pack 32. It should be understood that battery pack 32 may be otherwise configured (e.g., battery pack 32 may be configured to receive and/or otherwise accept alkaline or other types of batteries that may be removed/replaced by a user). In some embodiments, battery cells 38 are coupled to battery cells 40 via a cable or other type of conducting element extending through one or more of hinges 42; however, it should be understood that conductive connections for battery cells 38 and 40 may be otherwise provided. It should be understood that battery cells 38 and 40 may comprise a single battery cell or multiple battery cells. Further, in the embodiment illustrated in FIG. 2, batteries 38 and/or 40 provide additional weight and stability to electronic device 10 to reduce the likelihood of electronic device 10 tipping or falling over when supported in an upright position on a support surface.

In the embodiment illustrated in FIG. 2, arm 34 is rotatably coupled to base member 36 via one or more hinges 42 to enable rotation of arm 34 in the direction of arrows 44 and 46 relative to base member 36 and/or device 10. According to some embodiments, arm 34 is rotatable in the direction of arrow 46 such that arm 34 is positionable near, adjacent to and/or in contact with rear wall 26 in a stored position substantially parallel or even flush (i.e., flush or substantially flush) with rear wall 26. According to some embodiments, each hinge 42 comprises a friction clutch to enable fixed variable positioning of arm 34 relative to electronic device 10 to enable positioning of electronic device 10 at a desired orientation; however, it should be understood that other methods of fixing arm 34 at a desired location to obtain a desired viewing position of electronic device 10 may be used such as, for example, utilizing detents, push button locks, and/or other elements on hinge 42 or elsewhere.

In the embodiment illustrated in FIG. 2, power supply support system 12 comprises a single arm 34 extending substantially across a lateral dimension of rear wall 26 as measured in the direction indicated by arrow 39; however, it should be understood that power supply support system 12 may be otherwise configured. For example, according to some embodiments, power supply support system 12 may be configured such that arm 34 has a longer or shorter lateral dimension measured in the direction indicated by arrow 39 or may comprise multiple, spaced apart elements.

FIG. 3 is a diagram of power supply support system 12 of FIG. 1 detached from electronic device 10. In the embodiment illustrated in FIG. 3, at least a portion of support system 12 is disposable within a battery bay 48 of electronic device 10. For example, in the embodiment illustrated in FIG. 3, at least a portion of base member 36 is locatable within battery bay 48 of electronic device 10. In FIG. 3, base member 36 is formed/shaped such that at least a portion of base member 36 fits inside battery bay 48 such that an external surface/profile of at least a portion of base member 36 conforms to the surface/profile of rear wall 26. In the embodiment illustrated in FIG. 3, base member 36 comprises a connector member 50 communicatively coupleable to a corresponding connector member 52 disposed within battery bay 48 to enable power to be provided to electronic device 10 by battery cells 38 and/or

40 (FIG. 2). It should be understood that support system 12 may be otherwise coupled to electronic device 10 (e.g., coupled directly to any of walls 20, 22, 24, 26, 28 and/or 30) without utilizing battery bay 48.

According to some embodiments, power supply support system 12 is securely fastened to electronic device 10 by a locking mechanism 54. In the embodiment illustrated in FIG. 3, locking mechanism 54 comprises recessed areas 56 and 58 disposed on support member 36 and configured to receive corresponding extensions 60 and 62 disposed on electronic device 10, respectively. According to some embodiments, extensions 60 and 62 are outwardly biased into an extended position to releaseably engage recessed areas 56 and 58, respectively, to secure support system 12 to electronic device 12. In some embodiments, actuation of a release button 64 moves/retracts extensions 60 and 62 away from support system 12 to facilitate removal of system 12 from electronic device 10. For example, when coupling battery pack 32 to electronic device 10, extensions 56 and 58 are inserted into respective recessed areas 60 and 62 to securely fasten system 12 to electronic device. Extensions 56 and 58 may be configured to retract automatically in response to contact from system 12 or may be retracted by actuation of release button 64. To release battery pack 32 from electronic device 10, release button 64 is actuated to retract extensions 56 and 58 from recessed areas 60 and 62, respectively, to facilitate detachment of battery pack 32 from electronic device 10.

In the embodiment illustrated in FIG. 3, battery pack 32 comprises a recessed area forming a handle 66 to facilitate gripping and/or carrying of battery pack 32 and/or carrying electronic device 10 when battery pack 32 is coupled thereto. For example, in the embodiment illustrated in FIG. 3, handle 66 is disposed on a side of arm 34 opposite a side of arm 34 that is positioned near, adjacent to and/or in contact with rear wall 26 when in the stored position (e.g., substantially parallel and/or planar with rear wall 26). Thus, in the stored or even another position, a user's fingers can be inserted into handle 66 to facilitate carrying or transporting of electronic device 10. However, it should be understood that handle 66 may be otherwise configured.

Thus, embodiments provide a power supply support system 12 comprising a variably positionable arm 34 to position electronic device 10 at a desired viewing angle while also providing power to electronic device 10.

What is claimed is:

1. An electronic device, comprising:
    a housing supporting a display screen and having a battery bay; and
    a support assembly including a base member to be located within the battery bay and a variably positionable support arm rotatably coupled to the base member, the base member and the support arm each including an internal cavity to receive at least one battery cell, and the support arm to support the housing and the display screen in a plurality of different viewing orientations.

2. The electronic device of claim 1, wherein the support assembly includes a hinge with a friction clutch to rotatably connect the support arm to the base member and maintain the support arm in a plurality of positions to establish the plurality of different viewing orientations.

3. The electronic device of claim 1, wherein the support assembly comprises a battery pack for the electronic device.

4. The electronic device of claim 1, wherein the base the base member of the support assembly includes an electrical connector to be communicatively coupled with an electrical connector within the battery bay.

5. The electronic device of claim 1, wherein the electronic device is a tablet computer.

6. The electronic device of claim 1, wherein the support arm includes a recessed area forming a handle for carrying the electronic device.

7. A method of supporting and powering an electronic device, comprising:
    providing a housing having a display and a battery bay; and
    providing a battery pack including a base member and a support arm rotatably coupled to the base member, the base member and the support arm each to house battery cells,
    wherein, with the base member located within the battery bay,
        the support arm is to support the housing in a plurality of different orientations, and
        the battery cells are to power the electronic device.

8. The method of claim 7, wherein the battery cells are rechargeable.

9. The method of claim 7, wherein, with the base member located within the battery bay, an electrical connector of the base member is communicatively coupled with an electrical connector of the battery bay.

10. The method of claim 7, further comprising rotatably coupling the support arm to the base member with a friction clutch hinge.

11. The method of claim 7, wherein the electronic device is a tablet computer.

12. The method of claim 7, further comprising providing a handle on the support arm of the battery pack.

13. A tablet computer, comprising:
    a housing including a display and a battery bay;
    a battery pack base member including a base member cavity for a base member battery cell;
    a battery pack support arm including a support arm cavity for a support arm battery cell;
    at least a portion of the battery pack base member locatable within the battery bay of the housing; and
    the battery pack support arm rotatably coupled to the battery pack base member to support the display in a plurality of different viewing orientations.

14. The tablet computer of claim 13, wherein the battery pack support arm comprises a handle.

15. The tablet computer of claim 13, further comprising a friction hinge to rotatably couple the battery pack support arm to the battery pack base member and maintain the display in the plurality of different viewing orientations.

16. The tablet computer of claim 13, wherein the battery pack base member is releasably coupled with the housing.

17. The tablet computer of claim 13, wherein the base member battery cell and the support arm battery cell are conductively coupled.

18. The tablet computer of claim 13, wherein the base member battery cell and the support arm battery cell are to supply power to the tablet computer.

19. The tablet computer of claim 13, wherein the base member battery cell and the support arm battery cell each comprise multiple battery cells.

20. The tablet computer of claim 13, wherein an electrical connector of the battery pack base member is communicatively coupled with an electrical connector of the housing when the at least a portion of the battery pack base member is located within the battery bay.

* * * * *

UNITED STATES PATENT AND TRADEMARK OFFICE
CERTIFICATE OF CORRECTION

| | |
|---|---|
| PATENT NO. | : 8,704,487 B2 |
| APPLICATION NO. | : 11/786405 |
| DATED | : April 22, 2014 |
| INVENTOR(S) | : Mark S. Tracy et al. |

It is certified that error appears in the above-identified patent and that said Letters Patent is hereby corrected as shown below:

In the Claims

In column 3, line 63, in Claim 4, after "wherein" delete "the base".

Signed and Sealed this
Twenty-ninth Day of July, 2014

Michelle K. Lee
*Deputy Director of the United States Patent and Trademark Office*